(12) United States Patent
Baek et al.

(10) Patent No.: US 12,058,759 B2
(45) Date of Patent: Aug. 6, 2024

(54) METHOD AND DEVICE FOR PROCESSING DOWNLINK SRB MESSAGE IN MCG RLF

(71) Applicant: Samsung Electronics Co., Ltd., Suwon-si (KR)

(72) Inventors: Sangkyu Baek, Suwon-si (KR); Donggun Kim, Suwon-si (KR); Soenghun Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 351 days.

(21) Appl. No.: 17/593,665

(22) PCT Filed: Mar. 26, 2020

(86) PCT No.: PCT/KR2020/004104
§ 371 (c)(1),
(2) Date: Sep. 22, 2021

(87) PCT Pub. No.: WO2020/197277
PCT Pub. Date: Oct. 1, 2020

(65) Prior Publication Data
US 2022/0174771 A1 Jun. 2, 2022

(30) Foreign Application Priority Data

Mar. 27, 2019 (KR) .................. 10-2019-0034812
May 31, 2019 (KR) .................. 10-2019-0064692

(51) Int. Cl.
*H04W 4/00* (2018.01)
*H04W 76/15* (2018.01)
*H04W 76/19* (2018.01)

(52) U.S. Cl.
CPC .......... *H04W 76/19* (2018.02); *H04W 76/15* (2018.02)

(58) Field of Classification Search
None
See application file for complete search history.

(56) References Cited

U.S. PATENT DOCUMENTS

2012/0202557 A1　8/2012　Olofsson et al.
2014/0050102 A1　2/2014　Lee et al.
(Continued)

FOREIGN PATENT DOCUMENTS

KR　10-2020-0099465 A　8/2020
WO　　2012138079 A2　10/2012
(Continued)

OTHER PUBLICATIONS

International Search Report and Written Opinion of the International Searching Authority in connection with International Application No. PCT/KR2020/004104 issued Jul. 2, 2020, 9 pages.
(Continued)

*Primary Examiner* — Zewdu A Beyen

(57) ABSTRACT

The present disclosure relates to a communication technique for converging IoT technology with a 5G communication system for supporting a higher data transmission rate beyond a 4G system, and a system therefor. The present disclosure may be applied to an intelligent service (for example, a smart home, a smart building, a smart city, a smart car or connected car, health care, digital education, retail business a security and safety-related service, etc.) on the basis of 5G communication technology and IoT-related technology. The present invention relates to a method and a device for processing a message in a cell group radio link failure situation.

14 Claims, 20 Drawing Sheets

(56) References Cited

U.S. PATENT DOCUMENTS

| | | |
|---|---|---|
| 2015/0181479 A1 | 6/2015 | Lin et al. |
| 2017/0170941 A1 | 6/2017 | Yang et al. |
| 2018/0368018 A1* | 12/2018 | Kim ..................... H04L 69/08 |
| 2020/0059395 A1* | 2/2020 | Chen ................... H04W 28/082 |

FOREIGN PATENT DOCUMENTS

| | | |
|---|---|---|
| WO | 2014111027 A1 | 7/2014 |
| WO | 2015076639 A1 | 5/2015 |

OTHER PUBLICATIONS

3rd Generation Partnership Project; Technical Specification Group Radio Access Network; NR; Requirements for support of radio resource management (Release 15) 3GPP TS 38.133 V15.4.0, Dec. 2018, 876 pages.

* cited by examiner

METHOD AND DEVICE FOR PROCESSING DOWNLINK SRB MESSAGE IN MCG RLF

CROSS-REFERENCE TO RELATED APPLICATIONS

This application is a 371 of International Application No. PCT/KR2020/004104, filed Mar. 26, 2020, which claims priority to Korean Patent Application No. 10-2019-0034812, filed Mar. 27, 2019, and Korean Patent Application No. 10-2019-0064692, filed May 31, 2019, the disclosures of which are herein incorporated by reference in their entirety.

BACKGROUND

1. Field

The disclosure relates to a method and apparatus for processing a message when a radio link failure of a cell group occurs.

2. Description of Related Art

To meet the demand for wireless data traffic having increased since deployment of 4G communication systems, efforts have been made to develop an improved 5G or pre-5G communication system. Therefore, the 5G or pre-5G communication system is also called a "Beyond 4G Network" or a "Post LTE System". The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have also been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, machine type communication (MTC), and machine-to-machine (M2M) communication may be implemented by beamforming, MIMO, and array antennas. Application of a cloud radio access network (RAN) as the above-described big data processing technology may also be considered an example of convergence of the 5G technology with the IoT technology.

In the state in which a dual connectivity is established between a user equipment (UE) and a base station, and a master cell group and a secondary cell group are present, if a radio link failure (RLF) occurs in the master cell group since a radio link condition is poor, a method of reporting the RLF associated with the master cell group and a method of processing a downlink message in the case of the RLF may need to be defined.

SUMMARY

The disclosure provides a method and apparatus for processing a downlink message associated with a signaling radio bearer (SRB) in the case of an RLF of a master cell group.

In accordance with an aspect of the disclosure, a method by a user equipment (UE) may include: detecting a radio link failure of a master cell group; reporting information associated with the radio link failure to a base station via a secondary cell group; receiving data from the base station after the radio link failure; and transferring, in case that the data is received via a split signaling radio bearer (SRB) between the master cell group and the secondary cell group, from a packet data convergence protocol (PDCP) to a higher layer, a PDCP service data unit (SDU) associated with the data after a predetermined time.

In accordance with an aspect of the disclosure, a user equipment (UE) in a wireless communication system, may include: a transceiver; and a controller configured to: detect a radio link failure of a master cell group; control the transceiver to report information associated with the radio link failure to a base station via a secondary cell group; control the transceiver to receive data from the base station after the radio link failure; and transfer, in case that the data is received via a split signaling radio bearer (SRB) between the master cell group and the secondary cell group, from a packet data convergence protocol (PDCP) to a higher layer, a PDCP service data unit (SDU) associated with the data after a predetermined time.

According to an embodiment of the disclosure, reporting of an RLF associated with a master cell group is triggered, and a packet received via a downlink SRB is immediately transferred to a higher layer within a predetermined time, and thus, the downlink packet associated with the SRB may be effectively processed in the situation of a radio link failure.

DETAILED DESCRIPTION

Figure 1:
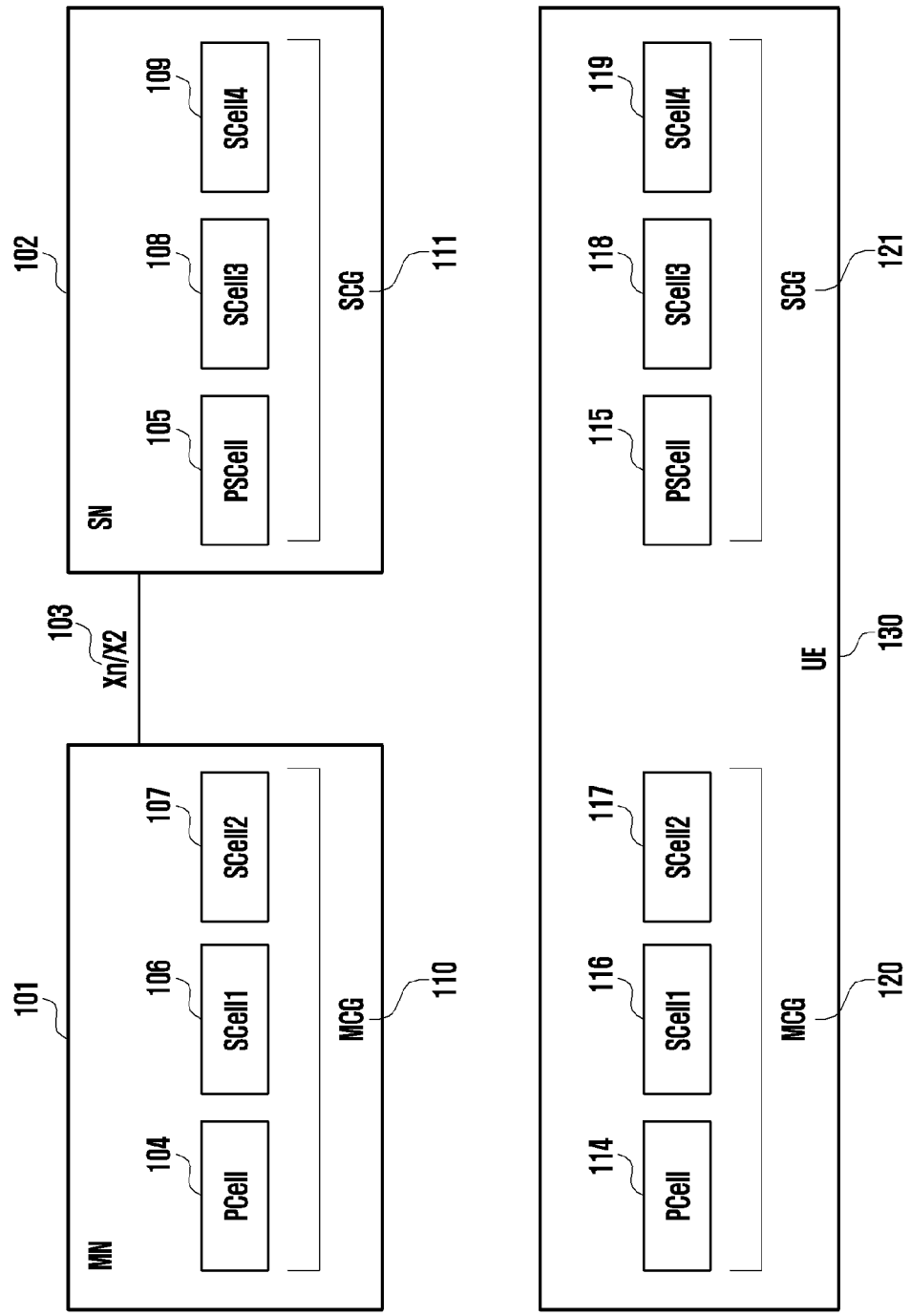
FIG. 1 is a diagram illustrating the structure of a dual connectivity between a base station and a user equipment (UE) in a wireless communication system.

Hereinafter, embodiments of the disclosure will be described in detail in conjunction with the accompanying drawings. In the following description of the disclosure, a detailed description of known functions or configurations incorporated herein will be omitted when it may make the subject matter of the disclosure unnecessarily unclear. The terms which will be described below are terms defined in consideration of the functions in the disclosure, and may be different according to users, intentions of the users, or customs. Therefore, the definitions of the terms should be made based on the contents throughout the specification.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements.

FIG. 1 is a diagram illustrating the structure of a dual connectivity between a base station and a user equipment (UE) in a wireless communication system.

In the dual connectivity structure, the base station may have two base station nodes 101 and 102, and the nodes are connected via an X2 interface or Xn interface 103. A node that is mainly connected to the UE is referred to as a master node (MN) 101 and a node that is secondarily connected for the dual connectivity structure is referred to as a secondary note (SN) 102.

The master node may be the anchor point of a signaling radio bearer 1 (SRB1) indicating radio resource control (RRC) configuration of a UE and a signaling radio bearer 2 (SRB2) capable of transmitting a non-access stratum (NAS) message that sets up the connection between a UE and a core network. Each node is connected to a UE via one or more cells and performs communication. The cells may be classified as a primary cell (PCell) 104 that is essentially connected to a master node, a primary secondary cell (PSCell) 105 that is essentially connected to a secondary node, and secondary cells (SCells) 106, 107, 108, and 109 that the nodes may respectively and secondarily have. Among them, the cells managed by the master node are generally called a "master cell group (MCG)" 110, and the cells managed by the secondary node are generally called a "secondary cell group (SCG)" 111.

Similarly, the UE 130 may perform transmission and reception with a base station via a PCell 114, a PSCell 115, and additional SCells 116, 117, 118, and 119. In this instance, the PCell, PSCell, and each SCell may not be physically different from those of the base station, but may be the corresponding resources of the same frequency band. Therefore, the UE may have a master cell group 120 and a secondary cell group 121, and they may be set to be identical in the process of connecting the base station and the UE.

If a radio link failure of the secondary cell group, that is, an SCG RLF, occurs since the radio link condition of the secondary cell group is poor in the dual connectivity structure, an SCG failure information message may be transmitted to the master node via the master cell group. The corresponding SCG failure information message may be transmitted via SRB1, and the base station that receives the corresponding message may direct reconfiguration (configuration) or release of the secondary cell group where the SCG RLF occurs. In this instance, data transmitted via the master cell group may be continuously transmitted without interruption, since the SCG RLF is only a matter of the secondary cell group and does not affect transmission performed via the master cell group.

In addition, even when the reconfiguration of an SCG fails, an SCG failure information message may be transmitted. Generally, an SCG RLF, a reconfiguration failure, and the like may be generally called an "SCG failure".

However, if a radio link failure of the master cell group, that is, an MCG RLF, occurs since the radio link condition of the master cell group is poor, the radio link condition of the master cell group is already poor and thus the corresponding information may not be transferred via the master cell group. Therefore, the master cell group needs to be reconfigured by performing an RRC connection reestablishment procedure. In the RRC connection reestablishment procedure, the corresponding operation may be performed only based on the radio link condition of the master cell group, irrespective of the connection state with the secondary cell group. Accordingly, interruption that also interrupts transmission of data which is transmitted via the secondary cell group may occur.

However, if the secondary cell group is available, interruption of data transmission of the secondary cell group is not always necessary. If the MCG RLF is capable of being reported via the secondary cell group, interruption due to RRC connection reestablishment may be prevented and interruption of data transmission of the secondary cell group may be prevented. In addition, in the case in which handover or RRC reconfiguration with synchronization (reconfiguration with sync) fails, RRC connection reestablishment may be performed. In this instance, a method similar to reporting an MCG RLF may be used. Generally, they may be generally called an MCG failure.

Figure 2:
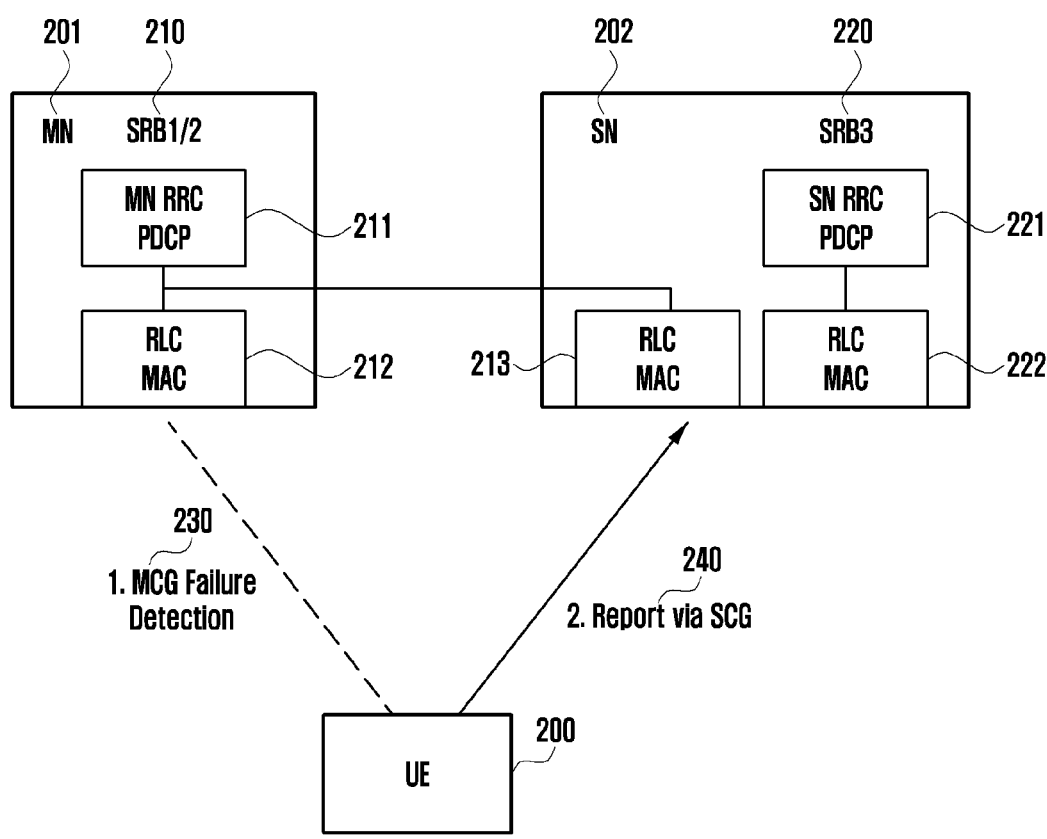
FIG. 2 is a diagram illustrating the structure of an SRB of a base station, and a method of reporting, by a UE, an MCG failure to a base station in the case of an MCG failure.

FIG. 2 is a diagram illustrating the structure of an SRB of a base station, and a method of reporting an MCG failure to a base station by a UE in the case of an MCG failure.

A signaling radio bearer (SRB) is a radio bearer for radio resource control (RRC) configuration of a base station, and the base station may indicate procedures such as RRC configuration, reconfiguration, reestablishment, and the like via an SRB. In addition, a UE may transmit a response message to a configuration message, a reconfiguration message, a reestablishment message of the base station via the SRB, and may transmit a message that the UE needs to trigger. For example, an SCG failure information message that is transmitted when an SCG failure occurs may be transmitted via an SRB.

An SRB may be differently configured as SRB1, SRB2, SRB3, and the like depending on the purpose. SRB1 and SRB2 210 may be configured between the master node 201 and the UE, and the SRB3 220 may be configured between the secondary node 202 and the UE. SRB1 210 may mostly transmit messages for direct connection between the UE and the base station. SRB2 210 may be mainly used for transmission of a non-access stratum (NAS) message between a core network and the UE. SRB3 220 may transmit messages for direct connection between the secondary node and the UE.

In this instance, in the case of SRB1 and SRB2, corresponding RRC and PDCP may be located in the master node as shown in diagram 211, and corresponding radio link control (RLC) and medium access control (MAC) may be located respectively in the master node and the secondary node as shown in diagrams 212 and 213. In this instance, if RLC is located in only the MCG, it is referred to as a non-split SRB. If RLC is located in each of the MCG and SCG, it is referred to as a split SRB. That is, in the case of SRB1, it may be referred to as split SRB1. Conversely, in the case of SRB3, corresponding RRC and PDCP are located in the secondary node as shown in the diagram 221, and corresponding RLC and MAC are also located in the secondary node as shown in diagram 222. Although some SRBs are merely described in the embodiment of FIG. 2, a data radio bearer (DRB) via which data is to be transmitted may be configured when the UE and the base station are connected.

If a UE 200 detects an MCG failure due to an MCG RLF or a failure of reconfiguration with synchronization in operation 230, transmission via the MCG is not available any longer, and thus, the UE 200 needs to report information indicating that the MCG failure occurs to a base station. In this instance, if an SCG link is available, the corresponding message may be transmitted using an SCG in operation 240. In this instance, if SRB1 is configured, split SRB1 210 may be available. If SRB3 is configured, the corresponding MCG failure information may be transferred to the secondary node 220 via SRB3.

However, the anchor node of SRB3 is the secondary node 220 and thus, the corresponding information needs to be transmitted again to the master node 210 that takes charge of MCG connection. In this instance, the content of the failure report message 240 transmitted to SRB3 may be forwarded as it is. However, according to another embodiment, a UE that has an MCG failure and the reason why the failure occurs may be reproduced and transmitted via another message. Subsequently, the base station or the master node of the base station may direct a handover to change the MCG of the UE or may direct reconfiguration with synchronization, in order to solve the MCG failure. According to an embodiment, the master node 201 and the secondary node 202 may be directed to perform a role swap that exchanges the roles of the master node 201 and the secondary node 202, or the like.

In this instance, the MCG failure information message may include the following information.

A cell group where a failure occurs (an MCG failure or an SCG failure)

The type of failure (an RLF or a failure of reconfiguration with sync.)

A measurement report configured by a master node

A measurement report configured by a secondary node

If the secondary cell group is managed by another radio access technology (RAT), the measurement report configured by the secondary node may include a message encoded based on coding used by RAT of the corresponding secondary cell group.

Figure 3:
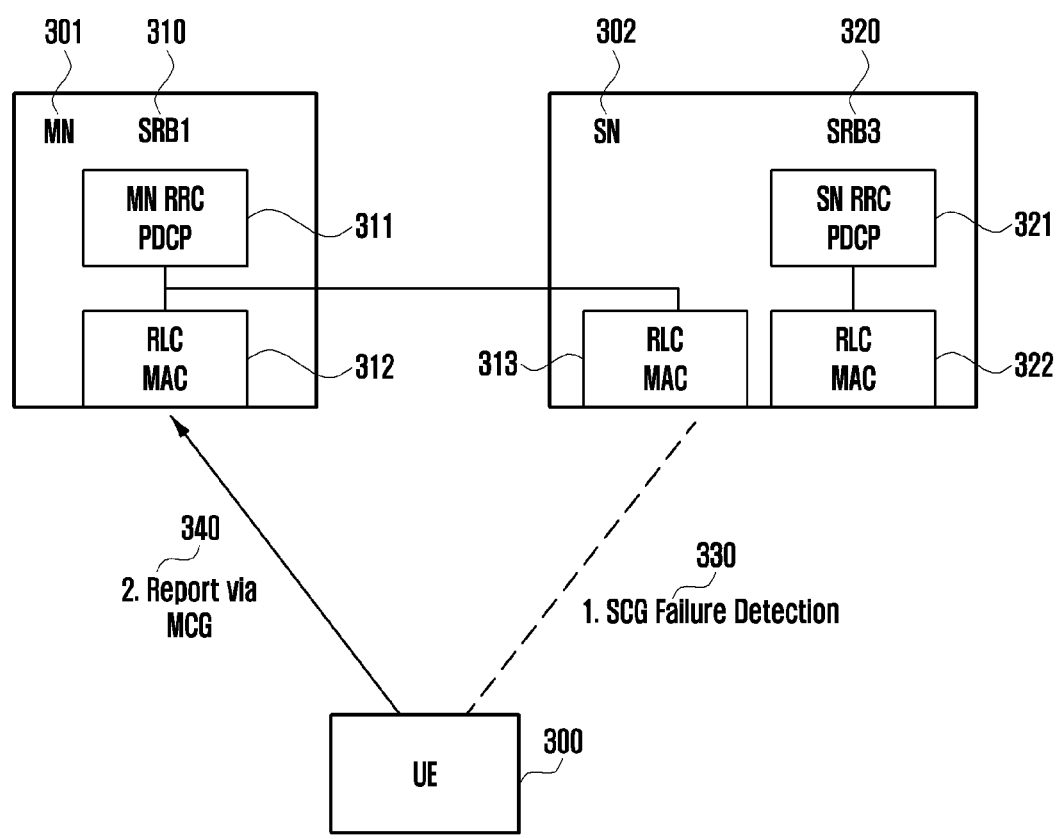
FIG. 3 is a diagram illustrating the structure of an SRB of a base station, and a method of reporting, by a UE, an SCG failure to a base station in the case of an SCG failure.

FIG. 3 is a diagram illustrating the structure of an SRB of a base station, and a method of reporting, by a UE, an SCG failure to a base station in the case of an SCG failure.

A signaling radio bearer (SRB) is a radio bearer for radio resource control (RRC) configuration of a base station, and the base station may indicate procedures such as RRC configuration, reconfiguration, reestablishment, and the like via an SRB. In addition, a UE may transmit a response message to a configuration message, a reconfiguration message, a reestablishment message of the base station via an SRB, and may transmit a message that the UE needs to trigger. For example, an SCG failure information message that is transmitted when an SCG failure occurs may be transmitted via an SRB.

An SRB may be differently configured as SRB1, SRB2, SRB3, and the like depending on the purpose. SRB1 and SRB2 310 may be configured between the master node 301 and the UE, and the SRB3 320 may be configured between the secondary node 302 and the UE. SRB1 310 may mostly transmit messages for direct connection between the UE and the base station. SRB2 310 may be mainly used for transmission of a non-access stratum (NAS) message between a core network and the UE. SRB3 320 may transmit messages for direct connection between the secondary node and the UE. In this instance, in the case of SRB1 and SRB2, corresponding RRC and PDCP may be located in the master node as shown in diagram 311, and corresponding radio link control (RLC) and medium access control (MAC) may be located in the master node and the secondary node respectively as shown in diagrams 312 and 313. In this instance, if RLC is located in only the MCG, it is referred to as a non-split SRB. If RLC is located in each of the MCG and SCG, it is referred to as a split SRB. That is, in the case of SRB1, it is referred to as split SRB1. Conversely, in the case of SRB3, corresponding RRC and PDCP are located in the secondary node as shown in the diagram 321, and corresponding RLC and MAC are also located in the secondary node as shown in diagram 322. Although some SRBs are merely described in the embodiment of FIG. 3, a data radio bearer (DRB) via which data is to be transmitted may be configured when the UE and the base station are connected.

If a UE 300 detects an SCG failure due to an SCG RLF, a failure of SCG reconfiguration, or the like in operation 330, transmission using the SCG is not available any longer, and thus, the UE 300 needs to report information indicating that an SCG failure occurs to the base station. In this instance, if an MCG link is available, the corresponding message may be transmitted using an MCG in operation 340. In this instance, if SRB1 is configured, SRB1 310 may be available. Subsequently, the base station or the master node of the base station may direct changing of the SCG of the UE or may direct reconfiguration with synchronization, in order to solve the SCG failure.

Figure 4:
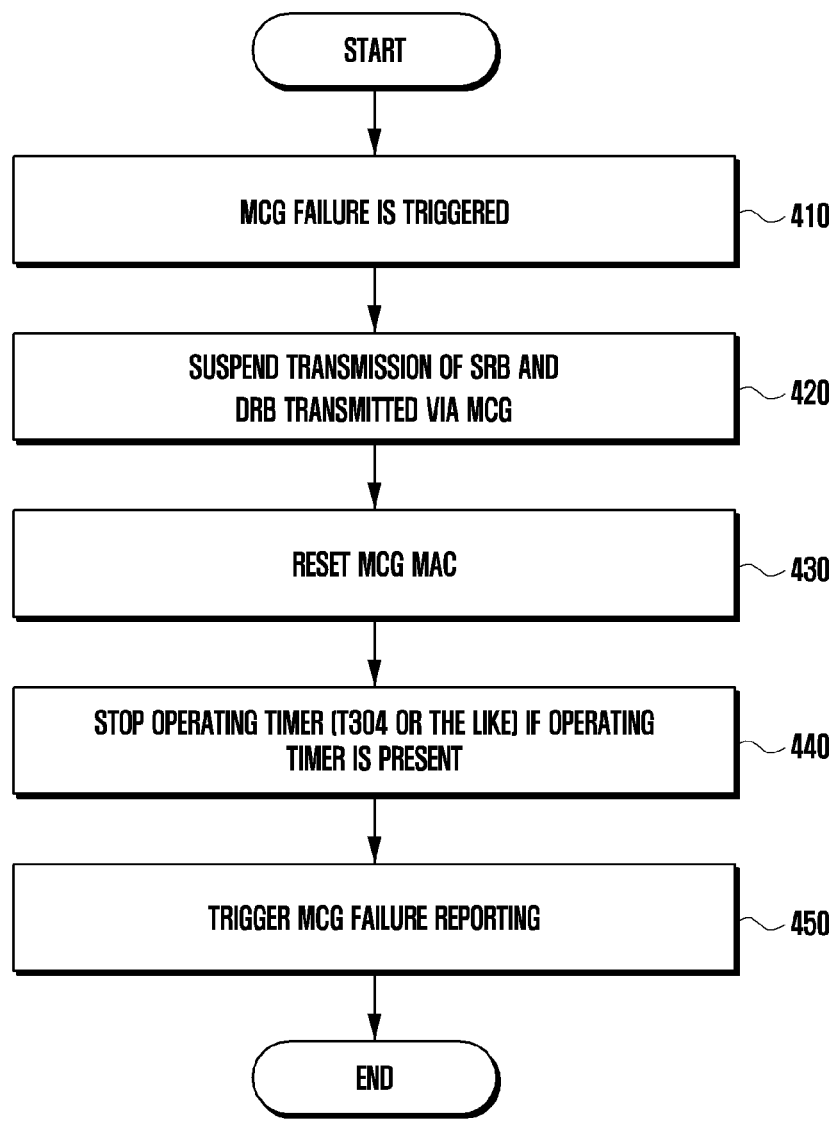
FIG. 4 is a diagram illustrating an operation process of a UE in the case of an MCG failure.

FIG. 4 is a diagram illustrating an operation process of a UE in the case of an MCG failure.

In the case of a UE, a master cell group failure, that is, an MCG failure, may be triggered due to an MCG RLF, such as the expiration of a T301 timer, a random-access failure, the number of times that retransmission is performed reaching the maximum number of retransmissions in RLC, and the like, a handover failure, a failure of reconfiguration with sync., and the like in operation 410. In the case of the MCG failure, data transmission via the master cell group is incapable of being performed properly. Accordingly, the UE may suspend transmission of all signaling radio bearers (SRBs) and data radio bearers (DRBs) transmitted via the master cell group in operation 420. In addition, the medium access control (MAC) of the master cell group is unavailable any longer and the MAC of the master cell group may be reset in operation 430.

In addition, if a T304 timer that operates for the purpose of handover or the like, or another operating timer is present, the corresponding timer may be stopped in operation 440 since the corresponding timer does not need to operate any longer. Subsequently, the UE may trigger MCG failure reporting and may report that the MCG failure occurs to the base station. The report may be provided via a secondary cell group. In this instance, split SRB1 capable of being transmitted via the secondary cell group or signaling radio bearer 3 (SRB3) directly transmitted to a secondary node may be used as a radio bearer in operation 450.

Figure 5:
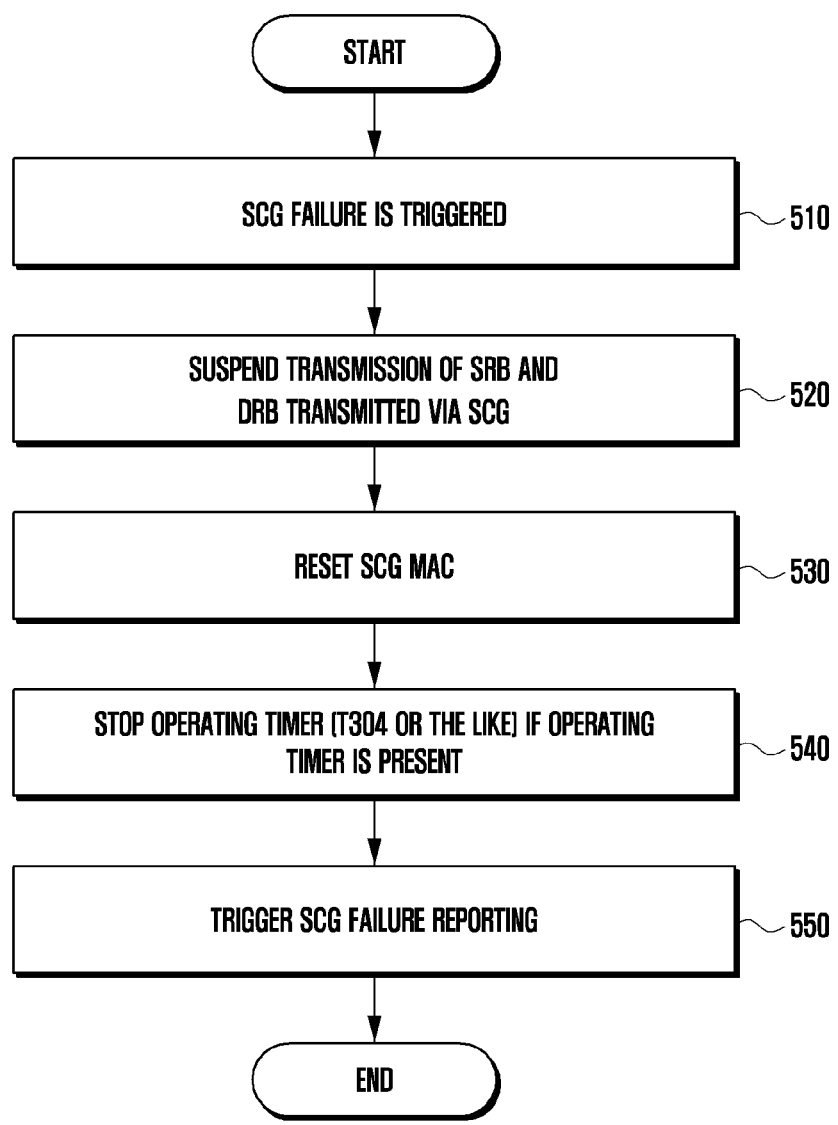
FIG. 5 is a diagram illustrating an operation process of a UE in the case of an SCG failure.

FIG. 5 is a diagram illustrating an operation process of a UE in the case of an SCG failure.

In the case of a UE, a secondary cell group failure, that is, an SCG failure, may be triggered due to an SCG RLF, such as the expiration of a T313 timer, a failure of random-access to an SCG, the number of times that retransmission is performed reaching the maximum number of retransmissions in SCG RLC, and the like, a SCG configuration failure, a failure or SCG reconfiguration with sync., and the like in operation 510. In the case of the SCG failure, data transmission via the secondary cell group is incapable of being performed properly. Accordingly, the UE may suspend transmission of all signaling radio bearers (SRBs) and data radio bearers (DRBs) transmitted via the secondary cell group in operation 520. In addition, the medium access control (MAC) of the secondary cell group is unavailable any longer and the MAC of the secondary cell group may be reset in operation 530.

In addition, if the T304 timer that operates for the purpose of handover or the like, or another operating timer is present, the corresponding timer may be stopped in operation 540 since the corresponding timer does not need to operate any longer. Subsequently, the UE may trigger SCG failure reporting and may report that the SCG failure occurs to the base station. The report may be provided via a master cell group. In this instance, SRB1 capable of being transmitted via the master cell group may be used as a radio bearer in operation 550.

Figure 6:
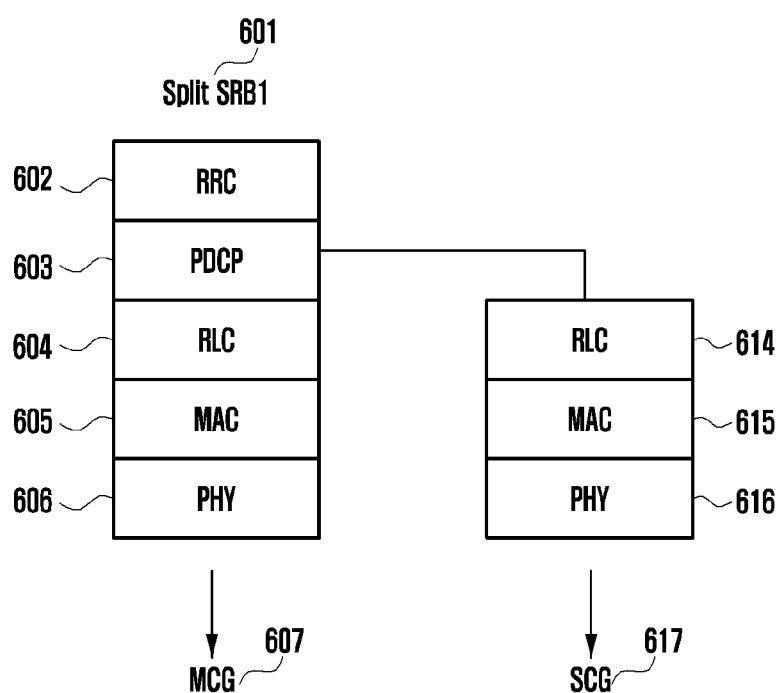
FIG. 6 is a diagram illustrating the protocol structure of split SRB1.

FIG. 6 is a diagram illustrating the protocol structure of split SRB1.

Split SRB1 601 may be configured to transmit an RRC message, and may include a single RRC layer 602 and a single packet data convergence protocol (PDCP) layer 603, and two or more radio link control (RLC) layers 604 and 614, medium access control (MAC) layers 605 and 615, and physical layers (PHY) 606 and 616, sequentially from the top. In this instance, "split" means that two or more RLC devices 604 and 614 are present in association with the corresponding radio bearer. In this instance, the term "RLC device" may be interchangeably used with an RLC bearer and a logical channel.

In the case of split SRB1, a single master cell group 607 and a single secondary cell group 617 may be used. In addition, the RRC of split SRB1 may be located in a master node, and the master node may manage RRC connection of a UE. In this instance, the RLC devices 604 and 614 of split SRB1 may be configured differently as a primary RLC (primary path) device that is always used irrespective of the amount of data to be transmitted, and a secondary RLC (secondary path) device that is used when data to be transmitted is greater than or equal to a threshold value (ul-DataSplitThreshold). The threshold value of the amount of data may be reported from a base station to the UE via RRC configuration. In addition, in the case of the corresponding split SRB1, packet duplication may be performed so that the PDCP device of a transmitter duplicates a packet and transmits data to all of the plurality of RLC devices. If packet duplication and transmission is activated, the plurality of RLC devices may be simultaneously used for packet transmission.

Figure 7:
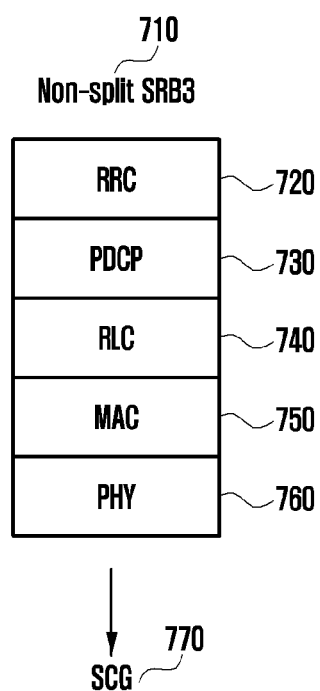
FIG. 7 is a diagram illustrating the protocol structure of SRB3 that is not split.

FIG. 7 is a diagram illustrating the protocol structure of signaling radio bearer 3 (SRB3) that is not split.

Non-split SRB3 710 may be configured to transmit an RRC message, and may include an RRC layer 720, a packet data convergence protocol (PDCP) layer 730, a radio link control (RLC) layer 740, a medium access control (MAC) layer 750, and a physical layer (PHY) 760, sequentially from the top. In this instance, "non-split" means that a single RLC device 740 is present in association with the corresponding ratio bearer. In this instance, the term "RLC device" may be interchangeably used with an RLC bearer and a logical channel. In the case of non-split SRB3, a secondary cell group 770 may be used. In addition, the RRC of SRB3 may be located in a secondary node, and the secondary node may manage a part of the RRC connection of the UE.

Figure 8:
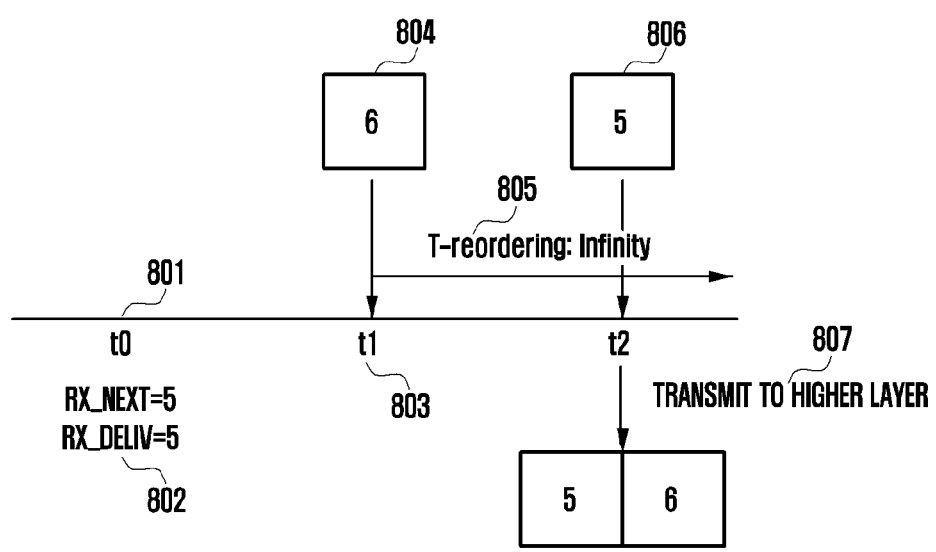
FIG. 8 is a diagram illustrating downlink PDCP reception associated with an SRB, which is performed by a UE.

FIG. 8 is a diagram illustrating downlink packet data convergence protocol (PDCP) reception associated with an SRB, which is performed by a UE.

The PDCP reception may include a process of updating a total of three variable values, RX_NEXT, RX_REORD, and RX_DELIV. The definition and the meaning of each variable is as follows.

The initial value of RX_NEXT is set to 0, and is defined to be a value obtained by adding 1 to the highest COUNT value among currently received packets, and may be construed as the COUNT value of a PDCP service data unit (SDU) (packet) expected to be subsequently received.

The initial value of RX_DELIV is set to 0, and is defined to be the COUNT value of a foremost PDCP SDU which is not yet transmitted to a higher layer at present and of which reception is currently awaited. Generally, it is construed as a value obtained by adding 1 to the highest COUNT value among COUNT values transmitted to a higher layer.

RX_REORD is the COUNT value of data indicated by a T-reordering timer when the timer starts. When the T-reordering timer expires, a PDCP SDU of which the turn is lower than or equal to RX_REORD is not awaited any longer.

If RX_NEXT and RX_DELIV among the variables of the UE are set to 5 at t0 801 in operation 802, this may indicate that PDCP SDUs up to a PDCP SDU having a COUNT value of 4 are completely transferred to a higher layer at present. Subsequently, if a PDCP SDU having a COUNT value of 6 is received at t1 803 in operation 804, the value of RX_NEXT may be updated with 7 (=6+1), and since a PDCP SDU having a COUNT value of 5 is not yet received (RX_DELIV<RX_NEXT), the T-reordering timer may start in operation 805. In this instance, RX_REORD is updated with 7 which is the value of RX_NEXT. The received PDCP SDU having a COUNT value of 6 may be stored in the PDCP layer, and a PDCP SDU having a COUNT value of 5 may be awaited.

Subsequently, if the PDCP SDU having a COUNT value of 5 is received at t2 in operation 806, both the PDCP SDU having a COUNT value of 5 and the PDCP SDU having a COUNT value of 6 are received and thus, they are sequentially transferred to the higher layer in operation 807.

In the case of an SRB such as SRB1, SRB2, SRB3, and the like, accurate transmission without an error is important and delay is unimportant and thus, the length of the T-reordering timer may use an infinite value (infinity). If an SRB message is lost due to a limited T-reordering timer value, a message transmitted via the SRB may be lost, and thus, the connection between the UE and the base station may significantly deteriorate. Therefore, it is generally necessary to use T-reordering having an infinite value.

Figure 9:
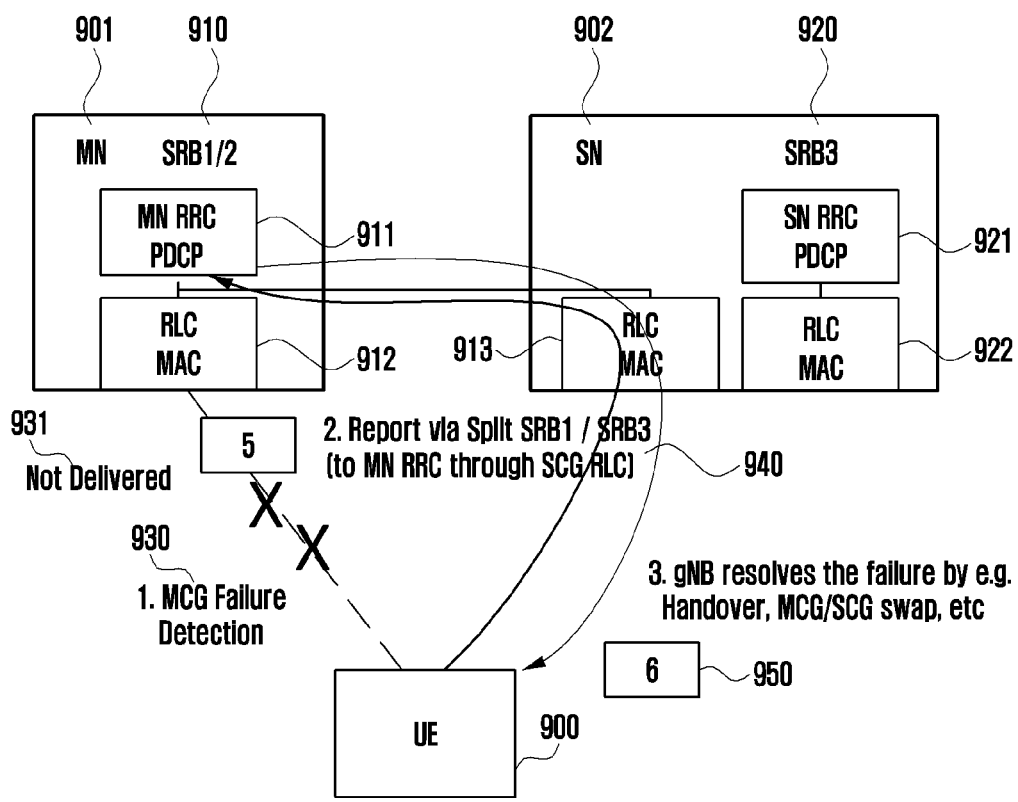
FIG. 9 is a diagram illustrating an MCG link recovery process based on an MCG failure report.

FIG. 9 is a diagram illustrating an MCG link recovery process based on an MCG failure report.

As described in FIGS. 2 and 4, in the case of an MCG failure 930, a UE 900 may transmit an MCG failure information message to a base station using split SRB1 or SRB3 in operation 940. The MCG failure information message is transmitted in the case of an MCG failure, and the MCG failure is triggered by the UE according to a predetermined condition, and thus, the base station has difficulty recognizing the accurate point in time at which the MCG failure is stated. Therefore, at the point in time of the MCG failure, perhaps transmission was being performed via MCG RLC of previously configured SRB1 or transmission of a PDCP SDU 931 of COUNT 5 was being performed as shown in FIG. 9. The corresponding packet may be transmitted to the UE, or may not be transmitted. However, due to the MCG failure stated by the UE, the base station may be incapable of identifying whether the PDCP SDU having COUNT 5 is successfully received.

Subsequently, the master node 901 may receive MCG failure information via RLC 913 or RRC 921 of the secondary node 902, and may command handover or direct a role swap to exchange the roles of the MCG and the SCG, or other operations, in order to overcome the MCG failure in operation 950. If the message is transmitted via the SCG RLC 913 of split SRB1, the message may be a PDCP SDU having COUNT 6 subsequent to COUNT 5 which was previously used, and may be transmitted in operation 950. However, if the PDCP SDU of COUNT 5 is not received but the PDCP SDU of COUNT 6 is received by the PDCP device of the UE, discontinuity may occur in received COUNT values as described in FIG. 8 (a PDCP SDU corresponding to COUNT 5 is not present).

Therefore, the PDCP SDU of COUNT 6 may not be transferred to a higher layer, and the PDCP SDU of COUNT 5 may be awaited as long as the time of the T-reordering timer. As described above, the length of the T-reordering timer associated with an SRB is infinite and thus, the message in operation 950, which is the PDCP SDU of COUNT 6, may not be transmitted to the UE.

Figure 10:
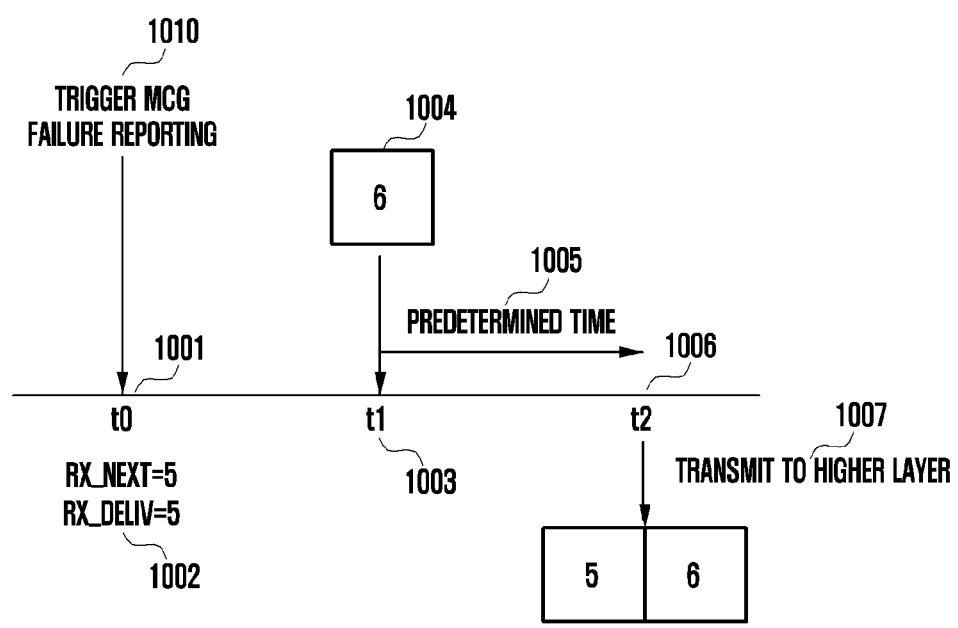
FIG. 10 is a diagram illustrating downlink PDCP reception associated with an SRB, which is performed by a UE in the case of an MCG failure according to the disclosure.

FIG. 10 is a diagram illustrating downlink PDCP reception associated with an SRB, which is performed by a UE in the case of an MCG failure, according to the disclosure.

In the embodiment of FIG. 10, it is assumed that the values of RX_NEXT and RX_DELIV among variables of a UE are set to 5 at t0 1001 in operation 1002. This means that PDCP SDUs up to a PDCP SDU having a COUNT value of 4 are completely transferred to a higher layer at present. If an MCG failure is stated at t0 and an MCG failure information message is transmitted via an SCG according to operations of FIG. 2 or FIG. 4 in operation 1010, an RRC message for enabling the UE to restore an MCG link may be received via the SCG of split SRB1 at t1 1003.

In this instance, it is assumed that the COUNT of the corresponding RRC message is 6 in operation 1004. In this instance, since the value of RX_DELIV is 5, if a PDCP SDU having a value of 5 is not received, a PDCP SDU 1004 having a COUNT value of 6 may not be transferred to a higher layer according to a general procedure. However, it could be the situation in which a PDCP SDU having a COUNT value of 5 is not transmitted since an MCG failure is stated at t0, and thus, it is difficult to await the corresponding PDCP SDU indefinitely. Therefore, at the point in time at which MCG failure reporting is triggered, the PDCP layer for receiving a downlink SRB for the UE may transfer a received packet to a higher layer immediately after a predetermined time 1005 in operation 1007. In this instance, the predetermined time may be 0, and this means that a packet received first after the MCG failure occurs is to be transferred immediately to a higher layer.

According to another embodiment, it is assumed that out-of-order delivery is configured, which transfers a received PDCP SDU to a higher layer without performing reordering in an SRB, after an MCG failure is stated or an MCG failure information message is transmitted.

According to another embodiment, after an MCG failure is stated or an MCG failure information message is transmitted, the value of a T-reordering timer may be set to a limited value, and a received PDCP SDU may be transmitted to a higher layer after the set limited time.

According to another embodiment, a value obtained by adding 1 to the COUNT value of a packet received first after an MCG failure is stated or an MCG failure information message is transmitted may be set as RX_DELIV, and the corresponding packet received first may be immediately transmitted to a higher layer. In the embodiment of FIG. 10, a PDCP SDU having a COUNT value of 6 may be a PDCP SDU received first after an MCG failure, the corresponding packet may be immediately transferred to a higher layer, and RX_DELIV may be updated with a value of 7. Subsequently, the value of RX_NEXT may be updated with a value of 7 via PDCP reception.

Although the embodiment of FIG. 10 describes operation performed after the MCG failure, the embodiment may be equally applied to operation of a split SRB in the case of an SCG failure. That is, the above-described operations may be applicable to a packet received first via a split SRB after an SCG failure occurs.

Figure 11:
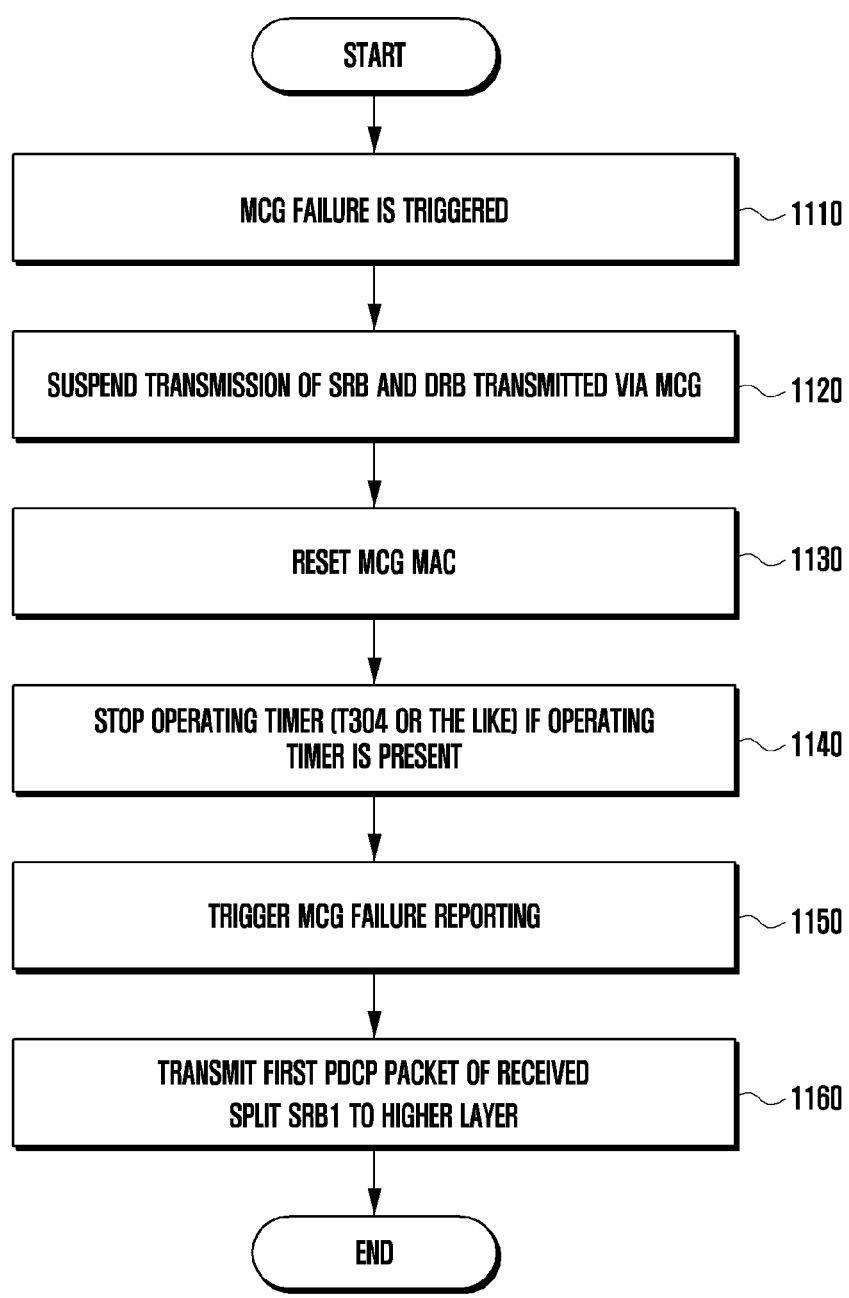
FIG. 11 is a diagram illustrating an operation process of a UE in the case of an MCG failure according to the disclosure.

FIG. 11 is a diagram illustrating an operation process of a UE in the case of an MCG failure according to the disclosure.

In the case of a UE, a master cell group failure, that is, an MCG failure, may be triggered due to an MCG RLF, such as the expiration of a T301 timer, a random-access failure, the number of times that retransmission is performed reaching the maximum number of retransmissions in RLC, and the like, a handover failure, a failure of reconfiguration with sync., and the like in operation 1110. In the case of the MCG failure, data transmission via the master cell group is incapable of being performed properly. Accordingly, the UE may suspend transmission of all signaling radio bearers (SRBs) and data radio bearers (DRBs) transmitted via the master cell group in operation 1120. In addition, the medium access control (MAC) of the master cell group is unavailable any longer and thus, the MAC of the master cell group may be reset in operation 1130. In addition, if a T304 timer that operates for the purpose of handover or the like or another operating timer is present, the corresponding timer may be stopped in operation 1140 since the corresponding timer does not need to operate any longer.

Subsequently, the UE may trigger MCG failure reporting and may report that the MCG failure occurs to a base station. The report may be provided via a secondary cell group. In this instance, split SRB1 capable of being transmitted via the secondary cell group or signaling radio bearer 3 (SRB3) directly transmitted to a secondary node may be used as a radio bearer in operation 1150. Subsequently, a packet received first via the split SRB1 may be transferred to a higher layer after a limited time, the limited time being greater than or equal to 0, and a delay caused by operation of the T-reordering timer for purpose of reordering may be prevented in operation 1160.

To this end, after the MCG failure is triggered, the value of the T-reordering timer may be reset to a predetermined limited value, or a packet received first may be transferred to a higher layer exceptively and the value of RX_DELIV may be set to a value obtained by adding 1 to the COUNT value of the received packet. According to another embodiment, the UE may activate an out-of-order delivery mode after the MCG failure occurs.

The operation may be maintained until first RRC configuration, RRC reconfiguration, or a response message in response to the MCG failure information message is received from the base station in a downlink. The response message may be a handover command, a role swap to exchange the roles of the MCG and the SCG, or other operations in order to overcome the MCG failure described in operation 950.

Figure 12:
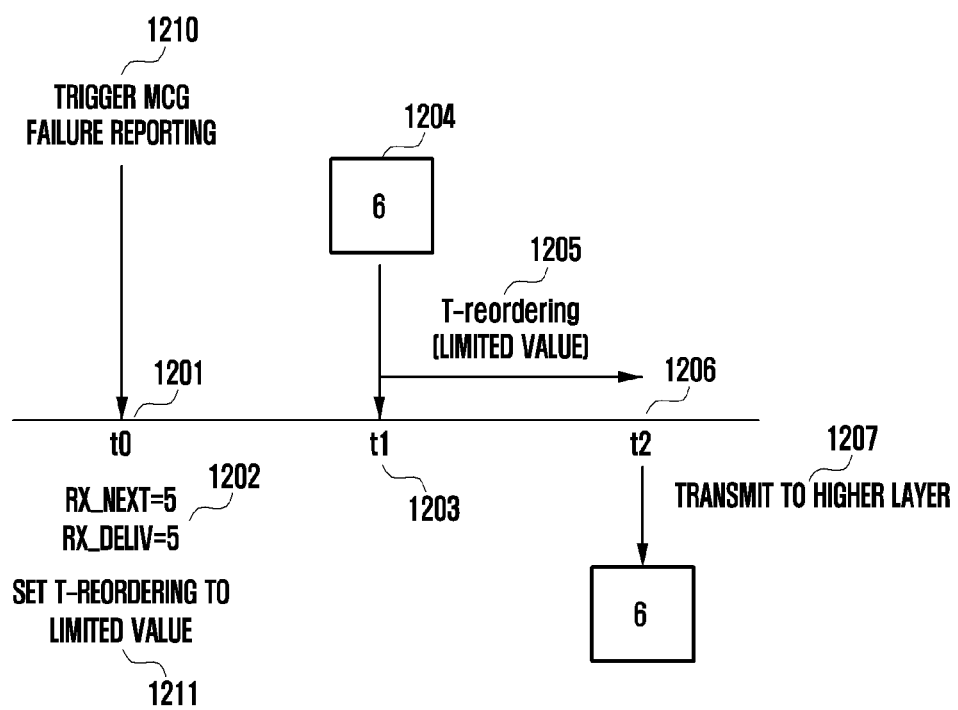
FIG. 12 is a diagram illustrating downlink PDCP reception associated with an SRB, which is performed by a UE in the case of an MCG failure, according to the disclosure.

FIG. 12 is a diagram illustrating downlink PDCP reception associated with an SRB, which is performed by a UE in the case of an MCG failure, according to the disclosure.

In the embodiment of FIG. 12, it is assumed that the values of RX_NEXT and RX_DELIV among variables of a UE are set to 5 at t0 1201 in operation 1202. This means that PDCP SDUs up to a PDCP SDU having a COUNT value of 4 are completely transferred to a higher layer at present. If an MCG failure is stated at t0 and an MCG failure information message is transmitted via an SCG according to operations of FIG. 2 or 4 in operation 1210, the value of a T-reordering timer may be set to a limited value in operation 1211 according to the embodiment of FIG. 12. The limited value may be randomly set by the UE, or may be set in advance by a base station. According to some embodiments, the limited value may be a preconfigured timer value and the length of the corresponding timer may be applied only when an MCG failure or an SCG failure occurs.

Subsequently, an RRC message for enabling the UE to restore an MCG link may be received via the SCG of split SRB1 at t1 1203. In this instance, it is assumed that the COUNT of the corresponding RRC message is 6 in operation 1206. In this instance, since the value of RX_DELIV is 5, if a PDCP SDU having a value of 5 is not received, a PDCP SDU 1204 having a COUNT value of 6 may not be transferred to a higher layer according to a general procedure. However, it could be the situation in which a PDCP SDU having a COUNT value of 5 is not transmitted since an MCG failure is stated at t0, and thus, it is difficult to await the corresponding PDCP SDU indefinitely. Therefore, at the point in time at which the MCG failure report is triggered, the T-reordering timer having the limited length set in operation 1211 is operated in operation 1205, and a PDCP SDU having a COUNT value of 6 may be immediately transferred to a higher layer at the point in time at which the corresponding timer expires in operation 1207. In this instance, the length of the corresponding T-reordering timer may be 0, and this means that a packet received first after the MCG failure is to be transferred immediately to a higher layer. Subsequently, RX_DELIV may be updated with a value of 7, and the value of RX_NEXT may be updated with a value of 7 via PDCP reception.

Although the embodiment of FIG. 12 describes operation performed after the MCG failure occurs, the embodiment may be equally applied to operation of a split SRB in the case of an SCG failure. That is, the above-described operations may be applicable to a packet received first via a split SRB after an SCG failure occurs.

Figure 13:
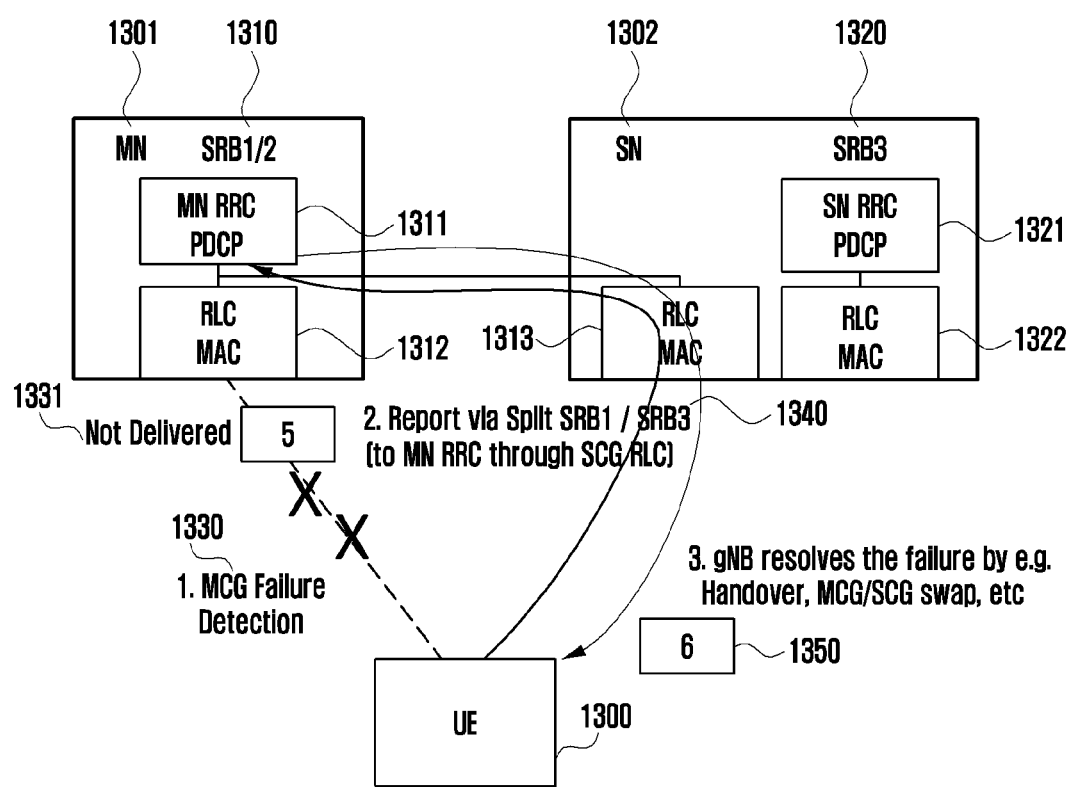
FIG. 13 is a diagram illustrating an MCG link recovery process based on an MCG failure report, according to the disclosure.

FIG. 13 is a diagram illustrating an MCG link recovery process based on an MCG failure report, according to the disclosure.

As described in FIGS. 2 and 4, in the case of an MCG failure 1330, a UE 1300 may transmit an MCG failure information message to a base station using split SRB1 or SRB3 in operation 1340. The MCG failure information message is transmitted in the case of an MCG failure, and the MCG failure is triggered by the UE according to a predetermined condition, and thus, the base station has difficulty recognizing the accurate point in time at which the MCG failure is stated. Therefore, at the point in time of the MCG failure, perhaps transmission via the MCG RLC of previously configured SRB1 was being performed, or transmission of a PDCP SDU 1331 having COUNT 5 was being performed as shown in FIG. 13. The corresponding packet may be transmitted to the UE, or may not be transmitted. However, due to the MCG failure stated by the UE, the base station may be incapable of identifying whether the PDCP SDU having COUNT 5 is successfully received.

Subsequently, a master node 1301 may receive MCG failure information via RLC 1313 or RRC 1321 of a secondary node 1302, and may command handover or may direct a role swap to exchange the roles of the MCG and the SCG or other operations in order to overcome the MCG failure in operation 1350. If the message is transmitted via the SCG RLC 1313 of split SRB1, the message may be a PDCP SDU having COUNT 6 subsequent to COUNT 5 which was previously used and may be transmitted in operation 1350. However, if a PDCP SDU of COUNT 5 is not received but the PDCP SDU of COUNT 6 is received by the PDCP device of the UE, discontinuity may occur in the received COUNT values as described in FIG. 8 (a PDCP SDU corresponding to COUNT 5 is not present). In order to prevent the same, the base station may retransmit the PDCP SDU corresponding to a COUNT value of 5, which was being transmitted via the MCG RLC, via the SCG RLC 1313. Subsequently, the PDCP SDU of COUNT 6 is transmitted so that the UE may sequentially receive PDCP SDUs in order of COUNT values. However, according to an embodiment, the PDCP SDU corresponding to a COUNT value of 5 may be an RRC message that is transferred irrespective of an MCG failure and thus, the PDCP SDU including only a PDCP header and an MAC-I field and excluding a data part may be transmitted via the SCG RLC 1313. In this instance, the MAC-I field may be updated with a value which is produced when the data part is deleted, and may be transmitted.

According to another embodiment, after the base station receives the MCG failure message, the base station may trigger a data recovery procedure associated with a DRB via split SRB1, and may perform transmission from a first PDCP SDU, the ACK for which is not received.

The criterion to determine the PDCP SDU corresponding to a COUNT value of 5, which was being transmitted, in the embodiment of FIG. 13 is a PDCP SDU which has been transmitted but successful transmission thereof is not acknowledged by a lower RLC layer. According to an embodiment, the PDCP SDU corresponding to a COUNT value of 5 is likely to be an unavailable message which was previously transmitted, and thus, if a PDCP SDU includes a data part, the UE may ignore the corresponding message. To this end, a field indicating a response message to the MCG failure information message may be needed, and only a message of which the corresponding field indicates the response message to the MCG failure information message may not be ignored and may be processed.

Figure 14:
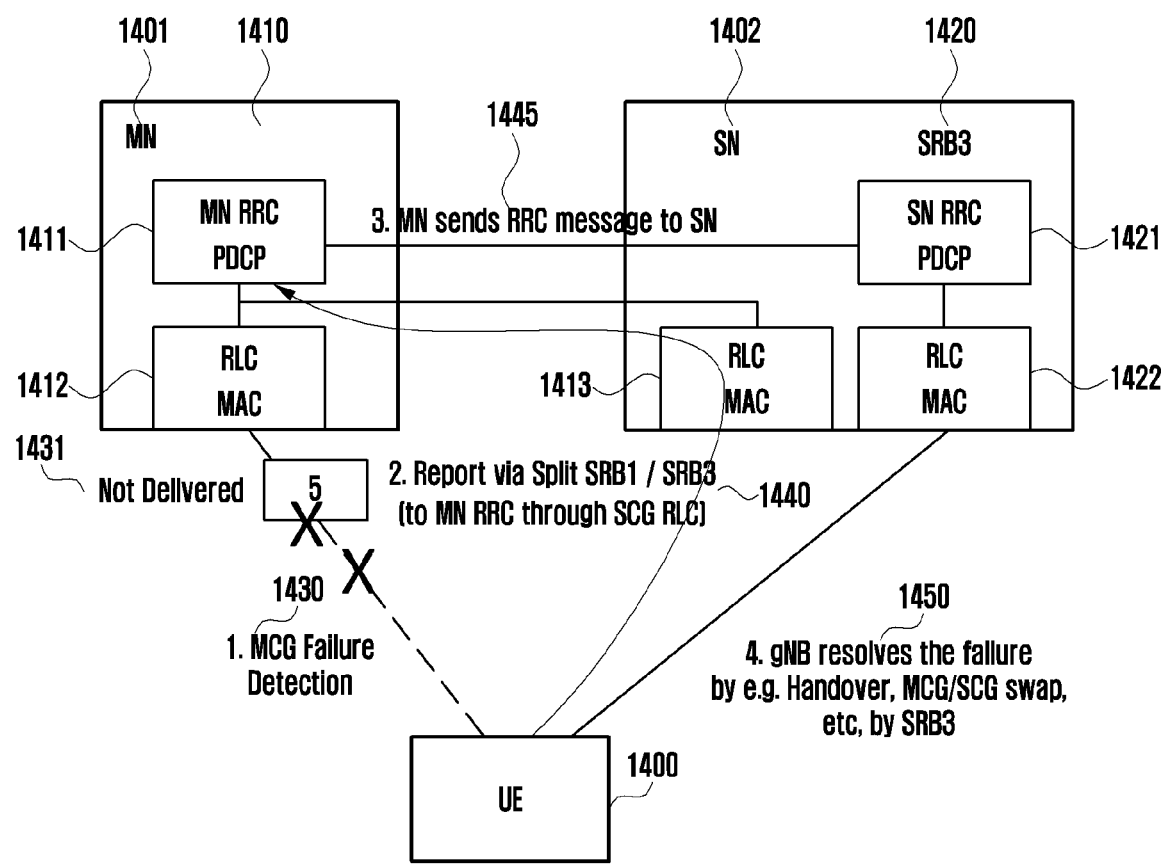
FIG. 14 is a diagram illustrating an MCG link recovery process based on an MCG failure report, according to the disclosure.

FIG. 14 is a diagram illustrating an MCG link recovery process based on an MCG failure report, according to the disclosure.

As described in FIGS. 2 and 4, in the case of an MCG failure 1430, a UE 1400 may transmit an MCG failure information message to a base station using split SRB1 or SRB3 in operation 1440. The MCG failure information message is transmitted in the case of an MCG failure, and the MCG failure is triggered by the UE according to a predetermined condition, and thus, the base station has difficulty recognizing the accurate point in time at which the MCG failure is stated. Therefore, at the point in time of the MCG failure, perhaps transmission via MCG RLC of previously configured SRB1 was being performed, or transmission of a PDCP SDU 1431 having COUNT 5 was being performed as shown in FIG. 14. The corresponding packet may be transmitted to the UE, or may not be transmitted. However, due to the MCG failure stated by the UE, the base station may be incapable of identifying whether the PDCP SDU having COUNT 5 is successfully received. Therefore, downlink transmission that uses split SRB1 may be unavailable since the PDCP SDU having a COUNT value of 5 is not transmitted and re-ordering is not performed.

Subsequently, a master node 1401 may receive MCG failure information via RLC 1413 or RRC 1421 of a secondary node 1402, and may command handover or direct a role swap to exchange the roles of the MCG and the SCG or other operations via SRB3 in order to overcome the MCG failure in operation 1450. To this end, the master node 1401 may transfer, to the secondary node 1402 via SRB 3, a message which is to be transferred to the UE in operation 1445. In the corresponding message, the whole or a part of a message to be transmitted in operation 1450 may be included. The secondary node 1402 may transmit the message 1445 to the UE after interpreting and reprocessing the message, or may transmit the message 1445 to the UE as it is without interpretation.

After operation 1450, the UE may perform configuration for the UE according to the message transmitted in operation 1450, and may transmit an RRC complete message via SRB1 or SRB3. In this instance, the message transmitted in operation 1450 may include a command to perform reestablishment of the PDCP of a split SRB.

Figure 15:
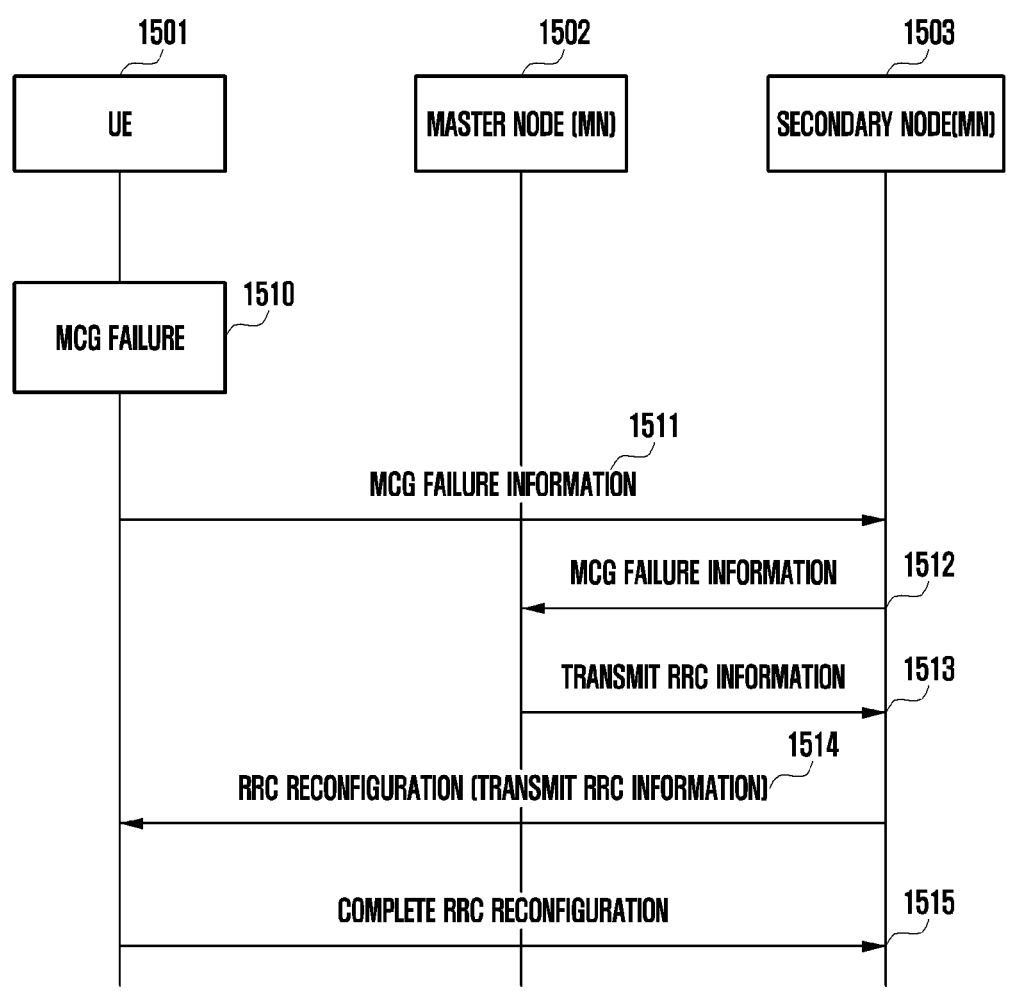
FIG. 15 is a diagram illustrating a message transmission procedure in an MCG link recovery process based on an MCG failure report, according to the disclosure.

FIG. 15 is a diagram illustrating a message transmission procedure in an MCG link recovery process based on an MCG failure report, according to the disclosure.

If a UE 1501 states an MCG failure described with reference to FIG. 2 or FIG. 4 in operation 1510, the UE 1501 may transmit MCG failure information to a secondary node 1503 via SRB3 in operation 1511. However, the secondary node does not manage an MCG connection with a UE and thus, the secondary node needs to transmit the corresponding message to a master node 1502 in operation 1512. Subsequently, the master node may transmit, to the UE, an RRC reconfiguration message in order to direct a handover or a role swap between an MCG and an SCG in operation 1514. In this instance, if SRB1 is unavailable, in order to transmit the configuration message to the UE via SRB3, the UE may transmit information to be used for RRC reconfiguration to the secondary node via an RRC information delivery message in operation 1513.

Subsequently, the secondary node may transmit an RRC reconfiguration message to the UE via SRB3, and the UE may transmit an RRC reconfiguration complete message to the secondary node after completing the configuration in operation 1515. However, according to another embodiment, the RRC reconfiguration complete message may be transmitted to the master node 1502 via SRB1.

Figure 16:
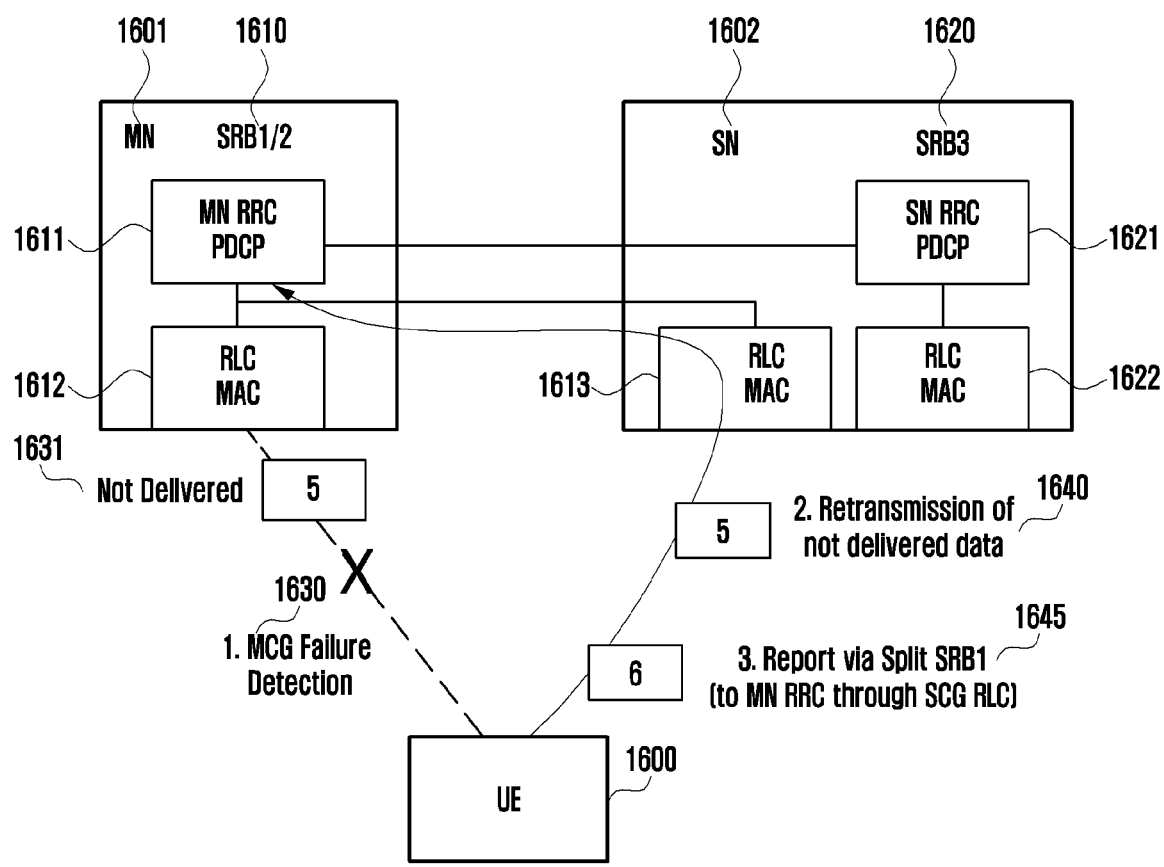
FIG. 16 is a diagram illustrating an uplink operation in an MCG link recovery process based on an MCG failure report, according to the disclosure.

FIG. 16 is a diagram illustrating an uplink operation in an MCG link recovery process based on an MCG failure report, according to the disclosure. Although operations described in FIGS. 9 to 14 are associated with an operation process in downlink communication, the same procedure may be performed in uplink communication so that a base station may easily receive an MCG failure information message.

As described in FIGS. 2 and 4, in the case of an MCG failure 1630, a UE 1600 may transmit an MCG failure information message to a base station using split SRB1 or SRB3 in operation 1845. The MCG failure information message is transmitted in the case of an MCG failure, and the MCG failure is triggered by the UE according to a predetermined condition, and thus, the base station has difficulty recognizing the accurate point in time at which the MCG failure is stated. Therefore, at the point in time of the MCG failure, perhaps transmission via the MCG RLC of previously configured SRB1 was being performed, or uplink transmission of a PDCP SDU 1831 having COUNT 5 was being performed as shown in FIG. 16. The corresponding packet may be transmitted to the base station, or may not be transmitted. However, due to the MCG failure stated, the UE may be incapable of identifying whether the PDCP SDU having COUNT 5 is successfully received.

Therefore, in the situation in which the PDCP SDU 1831 of COUNT 5 is incompletely transmitted when the MCG failure information message 1845 having a value of COUNT 6 is transmitted, discontinuity may occur in received COUNT values as described in FIG. 8 (a PDCP SDU corresponding to COUNT 5 is not present). In order to prevent the same, the UE may retransmit the PDCP SDU corresponding to a COUNT value of 5, which was being transmitted via the MCG RLC, via SCG RLC in operation 1840, in the embodiment of FIG. 16.

Subsequently, the PDCP SDU of COUNT 6, that is, the MCG failure information message 1845, may be transmitted, so that the base station sequentially receives PDCP SDUs in order of count values. However, according to an embodiment, the PDCP SDU corresponding to a COUNT value of 5 may be an RRC message that is transferred irrespective of an MCG failure and thus, the PDCP SDU including only a PDCP header and an MAC-I field and excluding a data part may be transmitted via SCG RLC 1813. In this instance, the MAC-I field may be updated with a value which is produced when the data part is deleted, and may be transmitted.

According to another embodiment, after the base station receives the MCG failure message, the base station may trigger a data recovery procedure associated with a DRB via split SRB1, and transmission may be performed from a first PDCP SDU, the ACK for which is not received by the base station.

The criterion to determine the PDCP SDU corresponding to a COUNT value of 5, which was being transmitted, in the embodiment of FIG. 16 is a PDCP SDU which has been transmitted but successful transmission thereof is not acknowledged by a lower RLC layer.

Figure 17:
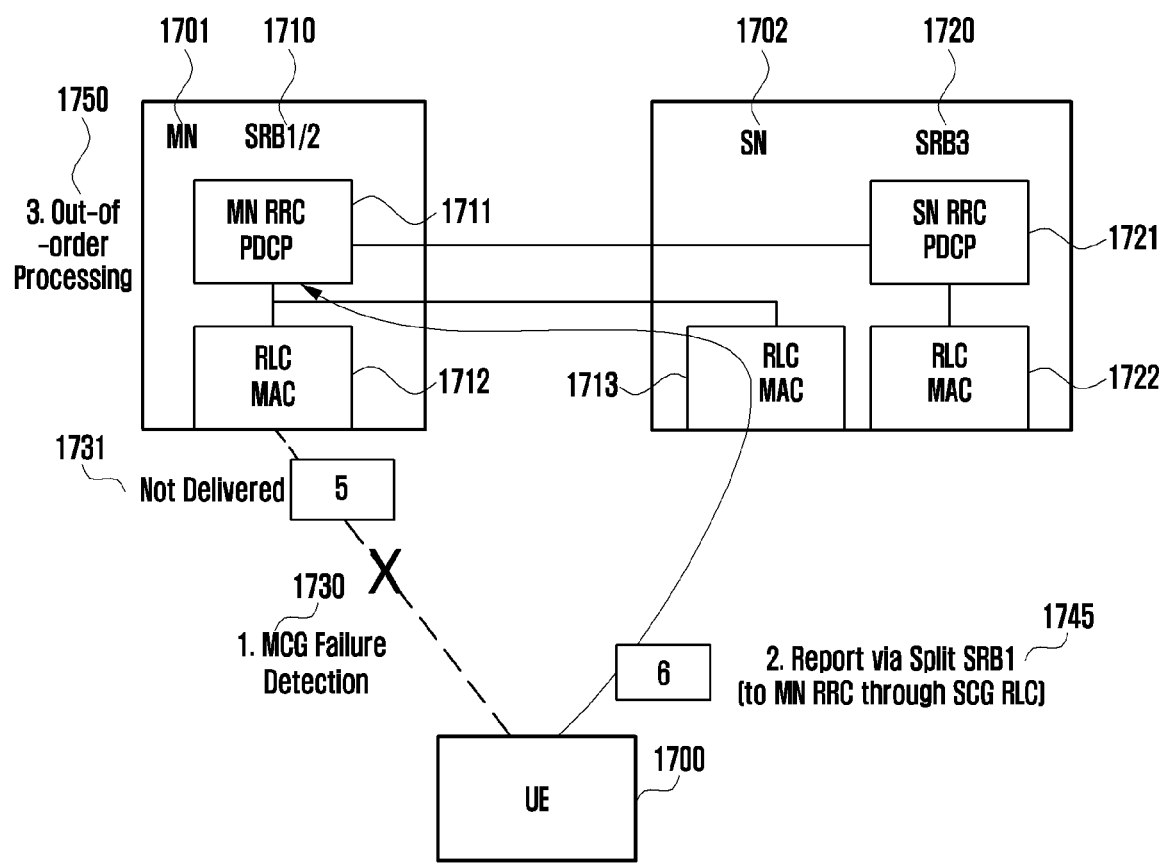
FIG. 17 is a diagram illustrating an uplink operation in an MCG link recovery process based on an MCG failure report, according to the disclosure.

FIG. 17 is a diagram illustrating an uplink operation in an MCG link recovery process based on an MCG failure report, according to the disclosure. Although operations described in FIGS. 9 to 14 are associated with an operation process in downlink communication, the same procedure may be performed in uplink communication so that a base station may easily receive an MCG failure information message.

As described in FIGS. 2 and 4, in the case of an MCG failure 1930, a UE 1900 may transmit an MCG failure information message to a base station using split SRB1 or SRB3 in operation 1940. The MCG failure information message is transmitted in the case of an MCG failure, and the MCG failure is triggered by the UE according to a predetermined condition, and thus, the base station has difficulty recognizing the accurate point in time at which the MCG failure is stated. Therefore, at the point in time of the MCG failure, perhaps transmission via the MCG RLC of previously configured SRB1 was being performed, or uplink transmission of a PDCP SDU 1731 of COUNT 5 was being performed as shown in FIG. 17. The corresponding packet may be transmitted to the base station, or may not be transmitted. However, due to the MCG failure stated, the UE may be incapable of identifying whether the PDCP SDU having COUNT 5 is successfully received.

Therefore, in the situation in which the PDCP SDU 1731 of COUNT 5 is incompletely transmitted when an MCG failure information message 1740 having a value of COUNT 6 is transmitted, discontinuity may occur in received COUNT values as described in FIG. 8 (a PDCP SDU corresponding to COUNT 5 is not present). Therefore, the PDCP SDU having COUNT 6 may not be transferred to a higher layer, and the PDCP SDU having COUNT 5 may be awaited as long as the time of a T-reordering timer. As described above, the length of the T-reordering timer associated with an SRB may be infinite and thus, the message in operation 1740, which is the PDCP SDU of COUNT 6, may not be transmitted to the UE. Therefore, the MN RRC or PDCP 1711 of the base station may perform a procedure of identifying whether a received RRC message or PDCP SDU is an MCG failure information message.

If the base station receives an MCG failure information message, the PDCP device of the base station may not perform a procedure of awaiting as long as the length of the existing T-reordering timer, but may immediately transfer the MCG failure information message to an RRC layer. In other words, the base station may perform out-of-order processing 1750. If the received message is not an MCG failure information message, the PDCP device of the base station may make the corresponding message await in the PDCP device, and may perform the procedure of awaiting as long as the length of the T-reordering timer.

The procedure may be an operation in which the base station applies the method 1211 of setting the value of the T-reordering timer to a limited value, as described in FIG. 12. The limited value may be randomly set by the base station, and the length of the timer may be applied only when an MCG failure or an SCG failure occurs.

Figure 18:
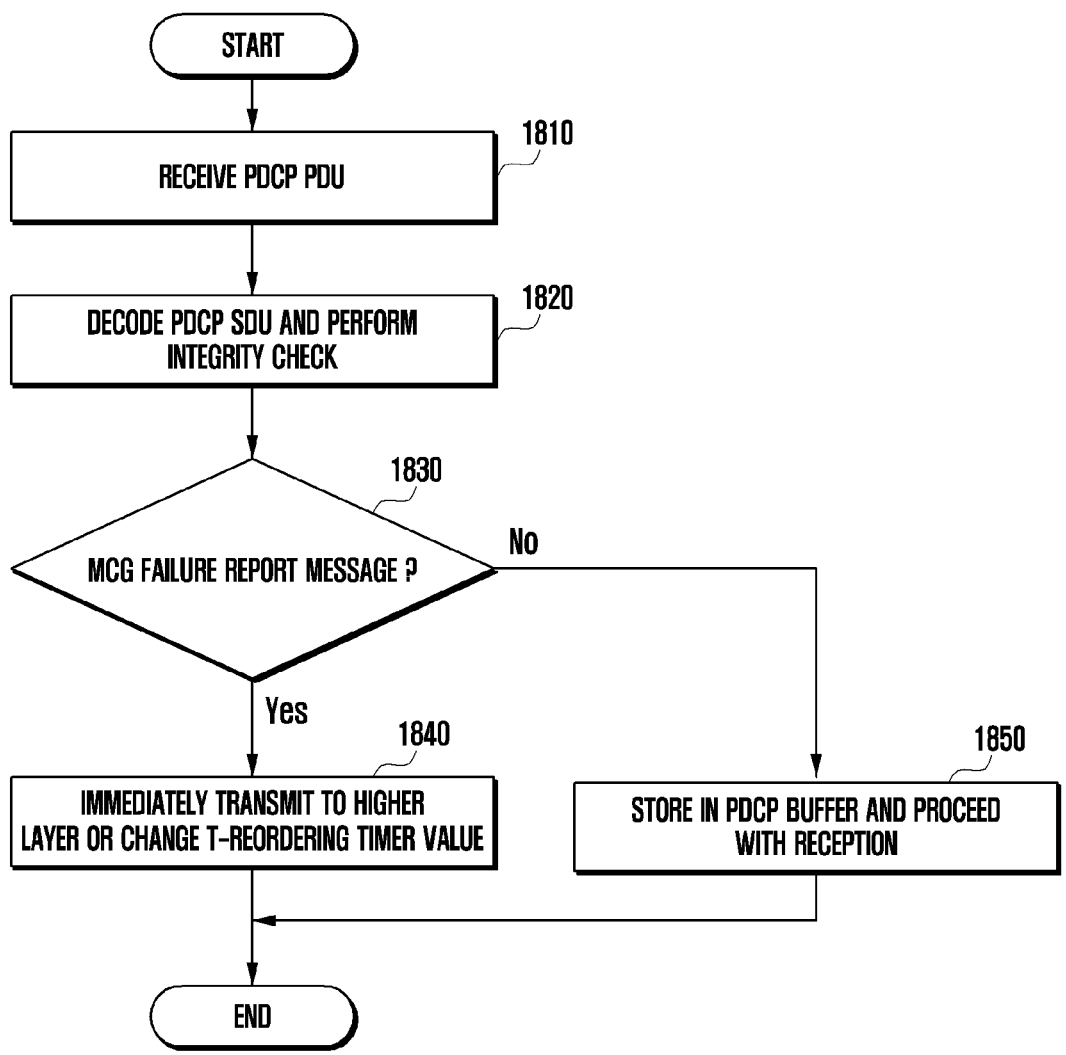
FIG. 18 is a diagram illustrating an operation of processing an MCG failure report message by a base station according to the disclosure.

FIG. 18 is a diagram illustrating an operation of processing an MCG failure report message by a base station according to the disclosure. A UE may transmit an MCG failure report message via split SRB1 when an MCG failure occurs. However, there may be an incompletely transmitted PDCP SDU as described in FIGS. 16 and 17. Accordingly, a reception PDCP device may need to perform a procedure of identifying whether a corresponding packet is an MCG failure report message.

To this end, if the PDCP device of the base station receives a PDCP PDU in operation 1810, the PDCP device may decode a PDCP SDU of the corresponding PDU and may perform integrity check in operation 1820. If the packet passes the integrity check, the packet is identified as a normal packet, and thus, the corresponding PDCP SDU is reliable.

The base station may identify the content of the PDCP SDU, and may identify whether the corresponding message is an MCG failure report message in operation 1830. If the corresponding message is an MCG failure report message, the message needs to be promptly processed in an RRC layer. Therefore, the base station may immediately transmit the corresponding MCG failure report message to a higher layer, that is, the RRC layer, or may change the value of the T-reordering timer to a limited small value so as to induce quick processing in operation 1840. If the corresponding message is different from an MCG failure report message, the base station may store the message in a PDCP buffer and may proceed with reception normally in operation 1850.

The operations described in FIG. 18 may be limited to split SRB1.

Figure 19:
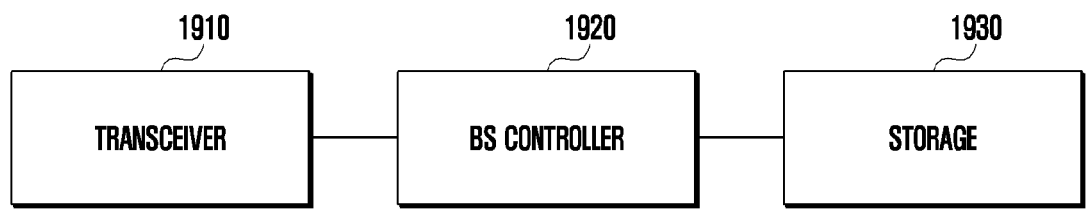
FIG. 19 is a block diagram illustrating the structure of a base station according to an embodiment.

FIG. 19 is a block diagram illustrating the structure of a base station according to an embodiment of the disclosure.

Referring to FIG. 19, the base station may include a transceiver 1910, a controller 1920, and a storage 1930. In the disclosure, the controller 1920 may be defined as a circuit, an application-specified integrated circuit, or at least one processor.

The transceiver 1910 may perform signal transmission or reception with another network entity. The transceiver 1910 may transmit, for example, system information to a UE, and may transmit a synchronization signal or a reference signal.

The controller 1920 may control overall operation of the base station according to the embodiments. For example, the controller 1920 may control a signal flow between blocks so that operations associated with the above-described flowchart are performed.

The storage 1930 may store at least one piece of information among information transmitted or received via the transceiver 1910 and information produced by the controller 1620.

Figure 20:
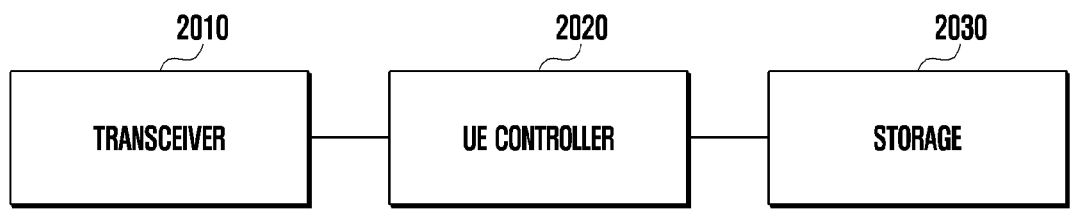
FIG. 20 is a diagram illustrating the structure of a UE according to an embodiment of the disclosure.

FIG. 20 is a diagram illustrating the structure of a UE according to an embodiment of the disclosure.

Referring to FIG. 20, the UE may include a transceiver 2010, a controller 2020, and a storage 2030. In the disclosure, the controller may be defined as a circuit, an application-specified integrated circuit, or at least one processor.

The transceiver 2010 may perform signal transmission or reception with another network entity. The transceiver 2010 may receive, for example, system information from a base station, and may receive a synchronization signal or a reference signal.

The controller 2020 may control overall operation of the UE according to the embodiments. For example, the controller 2020 may control a signal flow between blocks so that operations associated with the above-described flowchart are performed.

The storage 2030 may store at least one piece of information among information transmitted or received via the transceiver 2010 and information produced by the controller 2020.

In the above-described detailed embodiments of the disclosure, an element included in the disclosure is expressed in the singular or the plural according to presented detailed embodiments. However, the singular form or plural form is selected appropriately to the presented situation for the convenience of description, and the disclosure is not limited by elements expressed in the singular or the plural. Therefore, either an element expressed in the plural may also include a single element or an element expressed in the singular may also include multiple elements.

Although specific embodiments have been described in the detailed description of the disclosure, various modifications and changes may be made thereto without departing from the scope of the disclosure. Therefore, the scope of the disclosure should not be defined as being limited to the embodiments, but should be defined by the appended claims and equivalents thereof.

The invention claimed is:

1. A method by a user equipment (UE) in a wireless communication system, the method comprising:
   detecting a radio link failure of a master cell group (MCG);
   transmitting information on the radio link failure via a secondary cell group (SCG);
   receiving data, after a transmission of the radio link failure;
   in case that the data is received via a split signaling radio bearer (SRB) between the MCG and the SCG, resetting and starting a reordering timer for the split SRB based on a COUNT value of the data, wherein the reordering timer is used for detecting loss of packet data convergence protocol (PDCP) protocol data unit (PDU); and
   delivering, from a PDCP entity to an upper layer, a PDCP service data unit (SDU) associated with the data based on an expiration of the reordering timer,
   wherein a value of the reordering timer for the split SRB is reset from infinity to a predetermined value.

2. The method of claim 1, wherein the predetermined time is 0.

3. The method of claim 1,
further comprising:
   identifying a first state variable and a second state variable based on the COUNT value of the data, wherein the first state variable indicates a COUNT value of a next PDCP PDU expected to be received and the second state variable indicates a COUNT value of a first PDCP PDU not delivered to the upper layer;
   comparing the first state variable with the second state variable; and
   in case that a value of the first state variable is larger than a value of the second state variable, determining to start the reordering timer.

4. The method of claim 1, wherein the radio link failure is detected based on at least one of an expiration of a predetermined timer, a random-access failure, a number of times that retransmission is performed reaching a maximum number of retransmissions in a radio link control (RLC) layer, a handover failure, or a failure of reconfiguration with synchronization (reconfiguration with sync).

5. The method of claim 1, wherein data associated with the split SRB is continued to delivered from the PDCP entity to the upper layer, until a response message for the information is received.

6. The method of claim 5, wherein the response message comprises a handover command or a command to perform re-establishment of a PDCP associated with the split SRB.

7. The method of claim 1, further comprising:
   suspending transmission of all SRBs or data radio bearers (DRB) transmitted via the MCG based on a detection of the radio link failure; and
   resetting a medium access control (MAC) of the MCG.

8. A user equipment (UE) in a wireless communication system, the UE comprising:
   a transceiver; and
   a controller configured to:
      detect a radio link failure of a master cell group (MCG),
      control the transceiver to transmit information on the radio link failure via a secondary cell group (SCG),
      control the transceiver to receive data, after a transmission of the radio link failure,
      in case that the data is received via a split signaling radio bearer (SRB) between the MCG and the SCG, reset and start a reordering timer for the split SRB based on a COUNT value of the data, wherein the reordering timer is used for detecting loss of packet data convergence protocol (PDCP) protocol data unit (PDU), and
      deliver, from a PDCP entity to an upper layer, a PDCP service data unit (SDU) associated with the data based on an expiration of the reordering timer,
      wherein a value of the reordering timer for the split SRB is reset from infinity to a predetermined value.

9. The UE of claim 8, wherein the predetermined time is 0.

10. The UE of claim 8
wherein the controller is further configured to:
   identify a first state variable and a second state variable based on the COUNT value of the data, wherein the first state variable indicates a COUNT value of a next PDCP PDU expected to be received and the second state variable indicates a COUNT value of a first PDCP PDU not delivered to the upper layer;
   compare the first state variable with the second state variable; and
   in case that a value of the first state variable is larger than a value of the second state variable, determine to start the reordering timer.

11. The UE of claim 8, wherein the controller is further configured to detect the radio link failure based on at least one of an expiration of a predetermined timer, a random-access failure, a number of times that retransmission is performed reaching a maximum number of retransmissions in a radio link control (RLC) layer, a handover failure, or a failure of reconfiguration with synchronization (reconfiguration with sync).

12. The UE of claim 8, wherein the controller is further configured to continue to deliver, from the PDCP entity to the upper layer, data associated with the split SRB, until a response message for the information is received.

13. The UE of claim 12, wherein the response message comprises a handover command or a command to perform re-establishment of a PDCP associated with the split SRB.

14. The UE of claim 8, wherein the controller is further configured to suspend transmission of all SRBs or data radio bearers (DRB) transmitted via the MCG and to reset a medium access control (MAC) of the MCG based on a detection of the radio link failure.

* * * * *